J. B. RAICH.
MEAT CUTTING MACHINE.
APPLICATION FILED MAY 28, 1921.

1,398,571.

Patented Nov. 29, 1921.
4 SHEETS—SHEET 1.

Inventor
John B. Raich
By George J. Itsch
Attorney

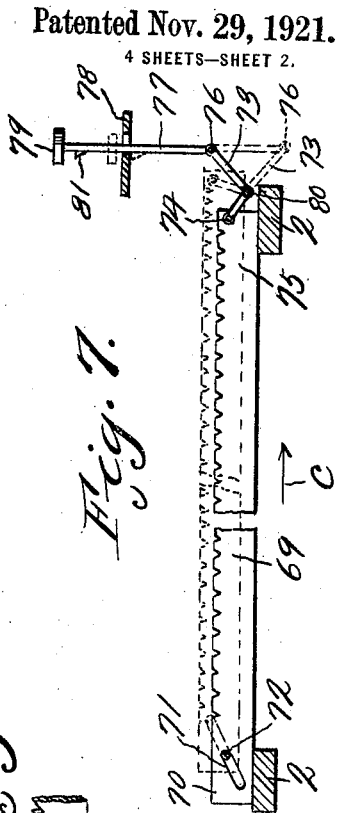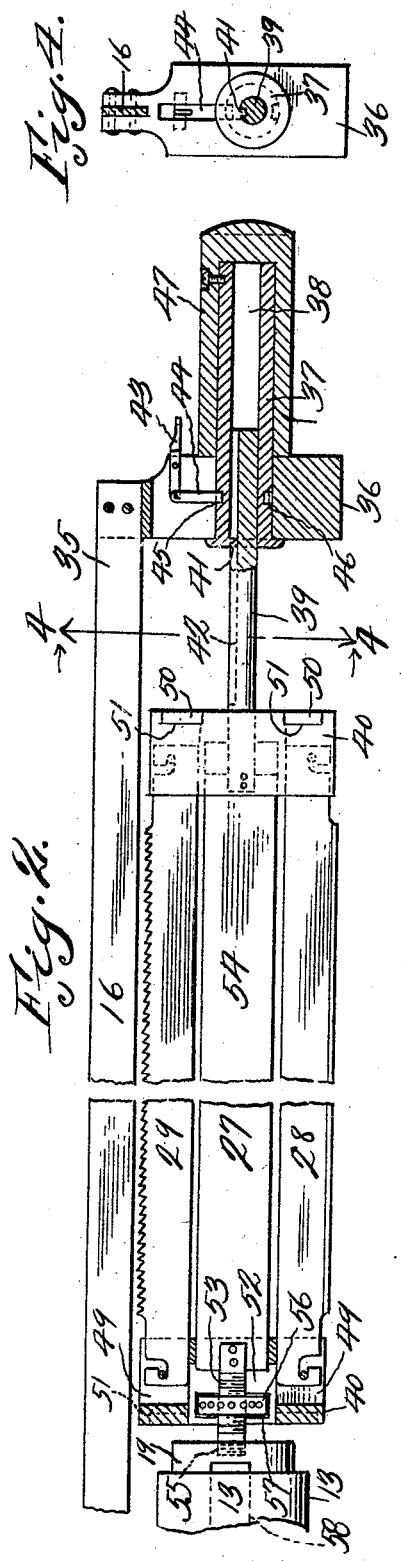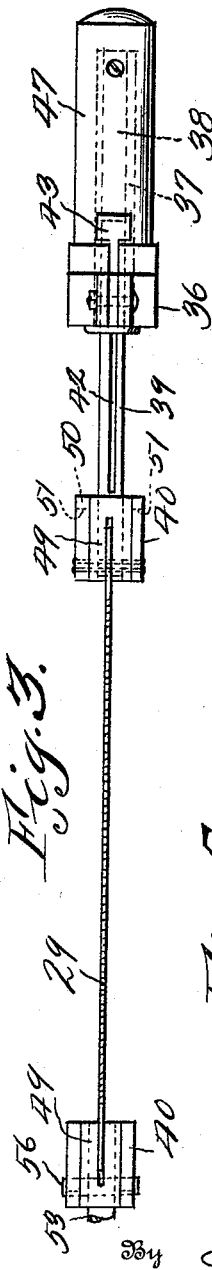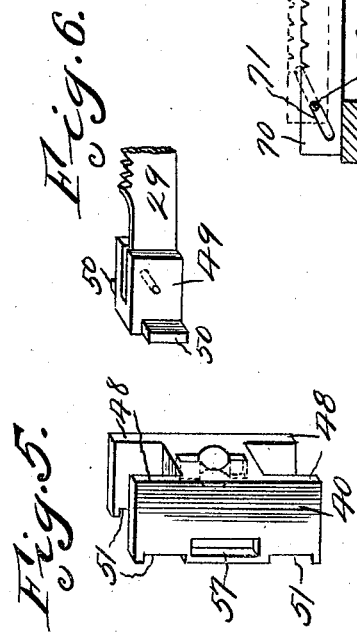

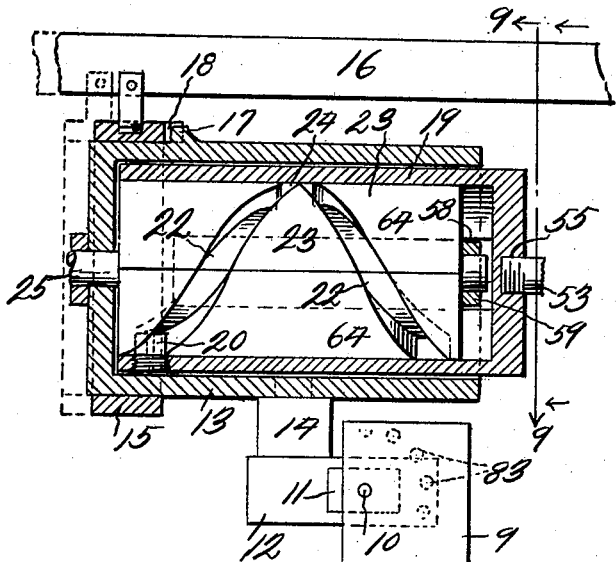
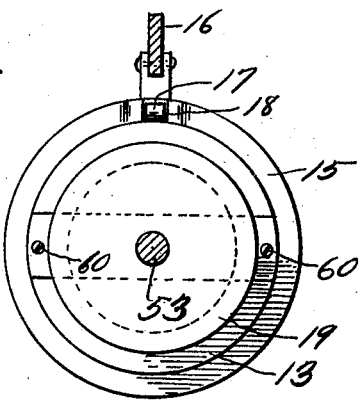
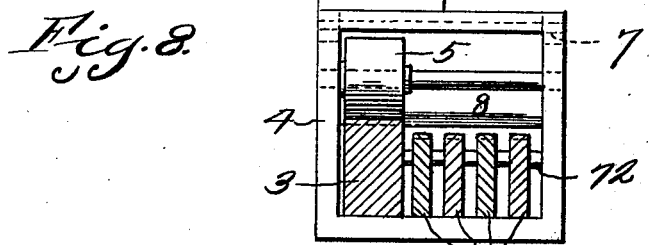
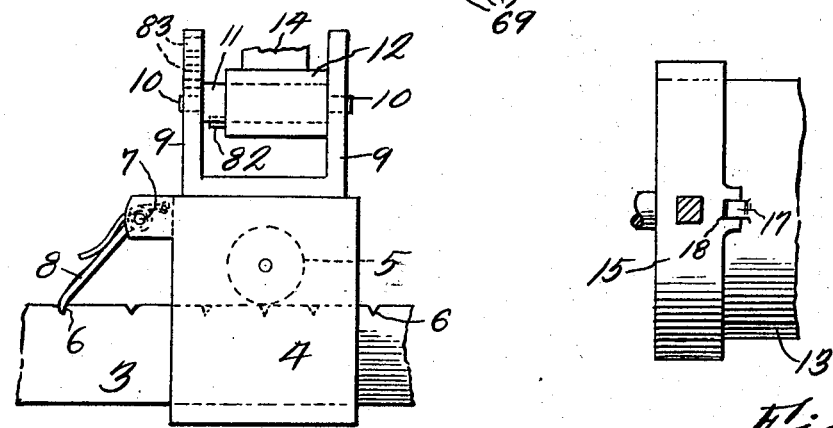
Fig. 8.
Fig. 9.
Fig. 10.
Fig. 11.
Inventor
John B. Raich
By George J. Itsch
Attorney J. B. RAICH.
MEAT CUTTING MACHINE.
APPLICATION FILED MAY 28, 1921.
1,398,571.
Patented Nov. 29, 1921.
4 SHEETS—SHEET 4.
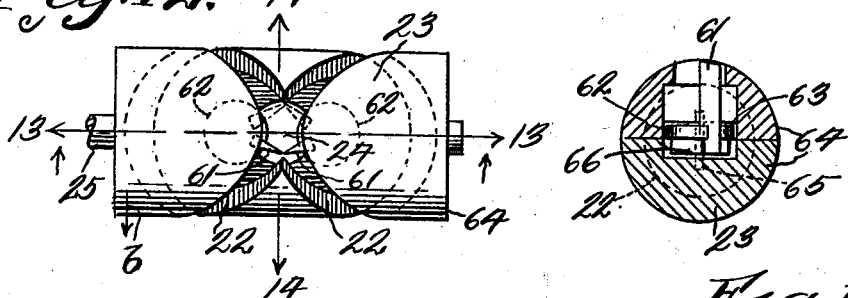
Fig. 12.
Fig. 14.
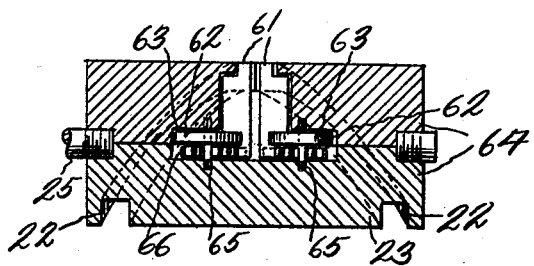
Fig. 13.
Fig. 16.
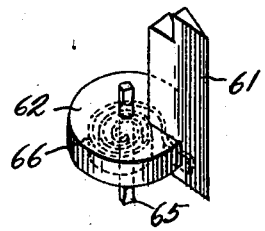
Fig. 15.
Inventor
John B. Raich
By George J. Ottsch
Attorney

UNITED STATES PATENT OFFICE.

JOHN B. RAICH, OF GARY, INDIANA, ASSIGNOR OF ONE-HALF TO JOHN A. BAUMGARTNER, OF SOUTH BEND, INDIANA.

MEAT-CUTTING MACHINE.

1,398,571.    Specification of Letters Patent.    Patented Nov. 29, 1921.

Application filed May 28, 1921. Serial No. 473,284.

*To all whom it may concern:*

Be it known that I, JOHN B. RAICH, a citizen of the United States, residing at Gary, in the county of Lake and State of Indiana, have invented certain new and useful Improvements in Meat-Cutting Machines, of which the following is a specification.

The invention relates to meat cutting machines and has for its object to provide a device of this character, by means of which meat may be cut or sawed into slices of predetermined thicknesses through the medium of a reciprocating knife or a reciprocating saw.

A further object is to provide a meat cutting machine comprising a pivoted frame having a reciprocating combined saw and knife frame therein, said reciprocating saw and knife frame being reciprocated through the medium of a rotating grooved cylinder disposed within a cylindrical casing carried by the pivoted frame. Also to provide gear means whereby the grooved cylinder may be rotated at will.

A further object is to provide a longitudinally movable carriage on which the pivoted frame is tiltable and on which tiltable frame is pivoted, said carriage being provided with a dog coöperating with any of a plurality of notches in vertically movable bars. Also to provide key means whereby any of the notched bars may be raised above the other notched bars thereby allowing meat to be cut in different thicknesses as selected according to the particular notched bar.

A further object is to provide means whereby the pivoted frame as a whole may be tilted to a position where it will rest on its side on the meat block thereby allowing parts carried thereby to be easily and quickly cleaned.

A further object is to provide means whereby either the knife or the saw may be easily and quickly shifted in position for use. Also to provide means whereby the meat may be easily held during a sawing or cutting operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Fig. 2 is an enlarged vertical longitudinal sectional view through the handle end of the pivoted frame and one of the saw and knife holding heads.

Fig. 3 is a top plan view of the saw and knife frame, showing a portion of the pivoted frame at the handle end thereof.

Fig. 4 is a vertical sectional view taken on line 4—4 of Fig. 2.

Fig. 5 is a detail perspective view of one of the saw and knife holding heads.

Fig. 6 is a detail perspective view of one of the saw or knife carried blocks which interengages with the saw or knife head.

Fig. 7 is a detail view of one of the notched bars, showing the key and lever for moving said bar vertically.

Fig. 8 is a vertical longitudinal sectional view through the casing of the cylindrical rotatable grooved member for reciprocating the saw and through the slice gaging bars.

Fig. 9 is a vertical sectional view taken on line 9—9 of Fig. 8, showing the casing of the grooved rotatable saw actuated member in end elevation.

Fig. 10 is a rear elevation of the movable carriage.

Fig. 11 is an enlarged detail view showing the interlocking means between the cylindrical grooved rotor casing and the annular collar carried by the pivoted frame.

Fig. 12 is a top plan view of the cylindrical grooved rotor, showing the means for guiding a roller at the intersecting points of the groove during a saw or knife reciprocating operation.

Fig. 13 is a longitudinal sectional view through the rotor taken on line 13—13 of Fig. 12.

Fig. 14 is a transverse sectional view through the rotor taken on line 14—14 of Fig. 12.

Fig. 15 is a detail perspective view of one of the roller guiding members, carried by the rotor.

Fig. 16 is a detail horizontal sectional view through the lower end of one of the guiding members and a shaft, showing the spring means for maintaining the guiding member in normal position.

Figure 1:
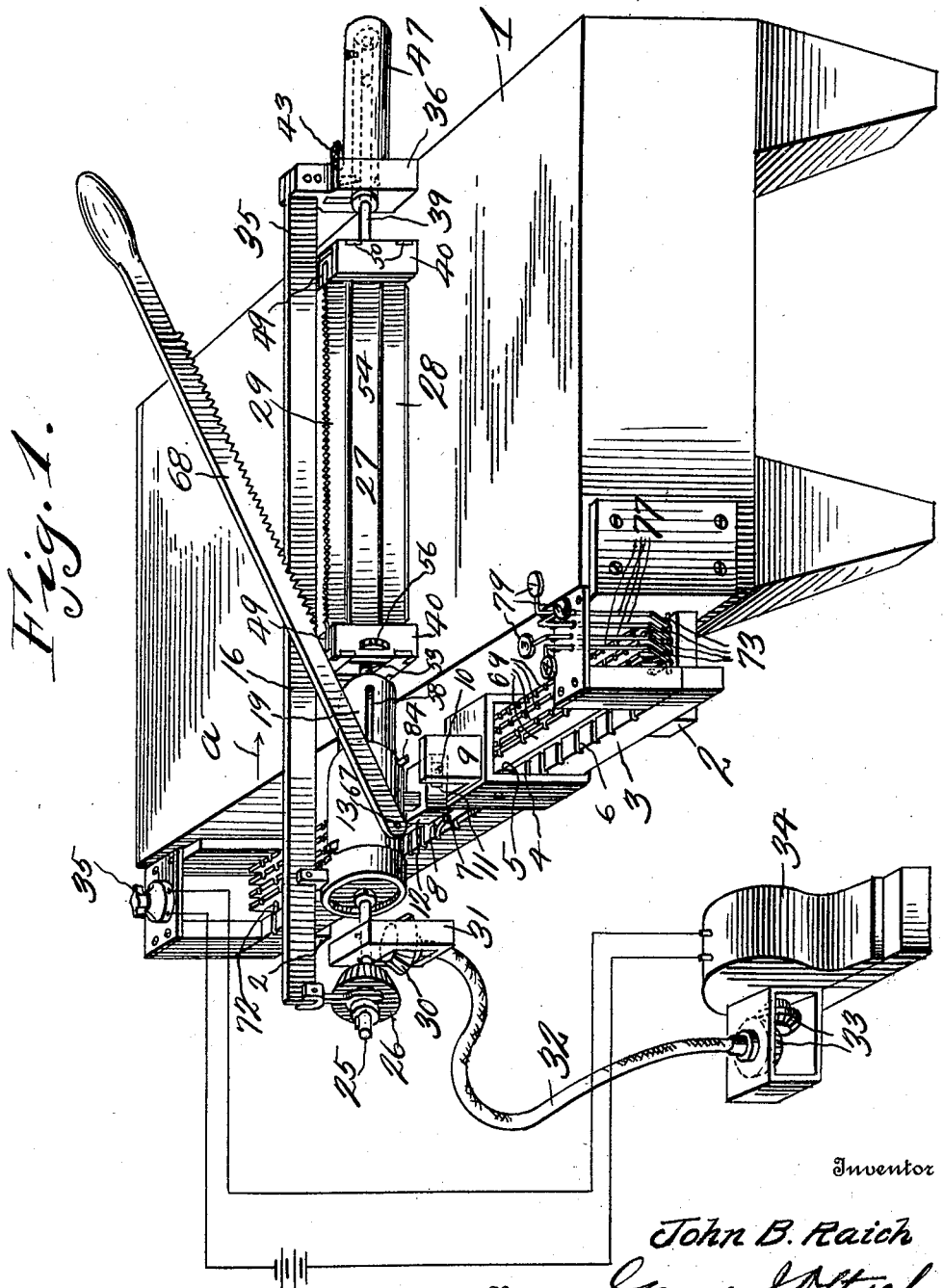
Figure 1 is a perspective view of the meat cutting machine.

Referring to the drawings, the numeral 1 designates a meat chopping block and 2 outwardly extending brackets extending outwardly from the rear face of the block. Disposed on the brackets 2 is a bar 3 on which bar is longitudinally movable a carriage 4 and supported thereon by means of a roller 5. Bar 3 is provided with a plurality of notches 6 equidistant, said notches being so spaced as to conform to the thickness of a conventional cut of meat. Pivotally connected to the carriage at 7 is a spring actuated dog 8, which dog coöperates with the notches 6 as the carriage 4 is moved in one direction in such a manner that the dog 8 will cam out of one notch and click into the next notch thereby signaling the operator when it is time to make another cut and that the carriage must be properly positioned on the bar 3. Extending upwardly from the carriage 4 are spaced arms 9, said spaced arms having rockably mounted in bearings thereof and on pintles 10 a rectangular shaped bar 11, and on said bar 11 is slidably mounted a block 12 which supports a cylindrical casing 13 through the medium of a post 14. It will be seen that the casing 13 may be tilted on the pintles 10 in such a manner that said casing may be positioned to various angles in a vertical plane. A cylindrical casing 13 is slidably mounted in a collar 15 which is secured to a reach bar 16 and is provided with a lug 17 which may be positioned in engagement with the notch 18 and collar 15 when the reach bar 16 is moved longitudinally from the dotted to the full line position shown in Fig. 8, thereby preventing circumferential movement of the cylindrical casing 13 or side pivotal action of the reach bar 16 secured to the collar 15.

Disposed within the cylindrical casing 13 is a cylindrical casing 19, which casing is adapted to be reciprocated within the cylindrical casing 3 by means of a roller 20 carried by the casing 19 and which roller engages in an endless spiral groove 22 extending spirally around a rotor 23 disposed within the casing 19 and which endless spiral groove 22 crosses at 24 at a point substantially centrally of the rotor. It will be seen that as the rotor 23 is rotated through the medium of the shaft 25 and gear 26 that the roller 20 will follow the groove 22 of the rotor 23 from one end of said rotor to the other, thereby imparting a reciprocating movement to the casing 19, which action will impart a reciprocating movement to the combined saw and knife frame 27 disposed above the meat chopping block 1 thereby moving the knife 28 or the saw 29 in such a manner as to cut the meat or to saw the bone. When the reach bar 16 is moved in the direction of the arrow $a$, Fig. 1, it will be seen that the beveled gear 26 will be moved into mesh with the constantly rotating bevel gear 30 carried by a pivoted yoke 31 loosely mounted on the shaft 25, said beveled gear 30 being rotated through the medium of a flexible shaft 32 having gear connections 33 with a conventional form of motor 34 which motor may be controlled through medium of a switch 35. The reach bar 16 extends across a block 1 and has its end 35 provided with a downwardly extending arm 36, in which arm is pivotally mounted a sleeve 37 in the bore 38 of which is slidably mounted a shaft 39 of one of the saw and knife frame heads 40, said shaft 39 being prevented from rotation in the bore 38 by means of a lug 41 which engages in an elongated groove 42 in the shaft 39. The lug 41 prevents the saw and knife frame 27 from pivotal movement during its reciprocation and maintains the saw 29 or knife 28 in position for sawing or cutting. Arm 36 is provided with a thumb engaging lever 43 which controls the detent 44, said detent when the knife 28 is in position for use as shown in Fig. 1 is disposed in the recess 45 of the sleeve 37, and when the saw is in position for use is disposed in the recess 46 of the sleeve 37. Disposed on the sleeve 37 and secured thereby is a cylindrical handle member 47, by means of which handle the knife frame and reach bar may be tilted upwardly on the pivotal point 10 so that meat may be placed beneath the device. Said handle member also forms means whereby the knife or saw may be easily controlled during a cutting or sawing operation and also forms means whereby the operator may apply additional pressure during a cutting or sawing operation. When it is desired to shift the saw 29 downwardly to position for use, the operator depresses the lever 43 which will raise the detent 44 out of engagement with the recess 45. After the detent 44 is raised the operator grasps the handle member 47 and imparts a half turn to the same, at which time the recess 46 will be positioned to receive the detent 44, which detent will hold the saw in operative position. The saw heads 40 are H-shaped and receive between the flanges 48 thereof blocks 49 which are detachably connected to the ends of the saw and the knife; said blocks 49 are provided with oppositely disposed lugs 50 which are received in the recess portions 51 in the outer faces of the heads 40. One of the heads 40 is provided with a centrally disposed chamber 52, and through which chamber 52 a threaded shaft 53 extends and has one of its ends secured to a bar 54, and its other end threaded at 55 into the cylindrical casing 19, said shaft 53 reciprocating with said cylindrical casing 19. Threaded on the threaded shaft 53 is an adjusting nut 56 which nut extends through oppositely disposed slots 57 in the side walls of the block 40 and forms means whereby the block 40 may be moved longitudinally on the threaded shaft 53 for holding and tightening the knife 28 and saw 29 in the knife and saw frame 27. It will be seen that by manipulating the adjusting nut 56 that the saw blade and knife may be easily and quickly placed in position on the frame 27 or removed therefrom, also that they may be properly tensioned in the frame for the cutting or sawing operation.

Extending through diametrically disposed and longitudinally disposed slots 58 in the cylindrical casing 19 is a guide bar 59, which guide bar guides the cylindrical casing 17 in its reciprocating movement during the rotation of a rotor 23, and prevents the casing 19 from rotating with said rotor, said guide bar 59 is secured at 60 to the end of the cylindrical casing 13. To guide the roller 20 diametrically across the intersecting point 24 of the grooves of the rotor 23 oppositely disposed guide members 61 are provided, said guide members being radially disposed and carried by disks 62 disposed in chambers 63 formed by registering chambers in the sections 64 of the rotor. The sections 64 of the rotor may be secured together in any suitable manner, such for instance as welding or by screws or rivets. Disks 62 are rotatably mounted on shafts 65 which have bearings in the rotor sections 64, and are connected to said shafts 65 through the medium of spiral springs 66, one end of each spring is connected to the shaft 65 while the other ends of said springs are connected to the guide members 61. It will be seen that coiled springs 66 will normally maintain the guide members 61 in the full line positions shown in Fig. 12, and that as the rotor 23 rotates, for instance in the direction of the arrow b, Fig. 12 that the roller 20 will be guided diagonally across the intersecting point 24 into the groove 22 each time that the roller 20 reaches said intersecting point, thereby insuring proper guiding of the roller during the continued rapid rotation of the rotor 23.

Pivotally secured at 67 to the side of the cylindrical casing 13 is a toothed lever 68, by means of which toothed lever the meat that is being cut may be held against movement thereby insuring an even cutting of the meat into slices of uniform thickness.

Disposed between the notched bar 3 and the rear side of the meat chopping block 1 is a plurality of spaced notched bars 69, which bars have their notches uniformly spaced but each bar having its notches differently spaced from the adjacent bars. The bars 69 form means whereby when said bars are raised to a position above the upper side of the bar 3 the dog 8 may be utilized in connection with the particular notched bar 69 which may have been raised to properly space the carriage 4 and the saw and knife frame 27 for severing the meat into slices of various thicknesses. The notched bars 69 are disposed on the brackets 2 and have their ends 70 provided with inclined slots 71 through which slots a shaft 72 extends, said shaft 72 forming means for raising the ends 70 of the bars when said bars are moved in the direction of the arrow c Fig. 7, through the medium of bell crank levers 73, one arm of each of which is pivotally connected at 74 to the ends 75 of each bar and the other arm of each bell crank lever is connected at 76 to a push rod 77 which extends upwardly through a guide plate 78 and is provided with a key 79. When a particular thickness of cut is desired, the operator depresses the desired key 79. When the key 79 is depressed the bell crank lever 73 is rocked on the shaft 80 thereby imparting a movement to the notched bar 69 in the direction of the arrow c. During the movement of the bars 69 the rear ends 70 thereof will move upwardly until the bell crank lever 73 assumes the position shown in dotted lines in Fig. 7. However as an additional means for maintaining the bars 69 in raised position the push rod 77 may be provided with a lug 81 for engaging under the guide plate 78 adjacent the aperture therein.

During the operation of the machine the operator grasps the handle member 47, pulls the same toward him which action will mesh the gears 26 and 30 thereby imparting rotary movement to the rotor 23 which in turn imparts a reciprocating movement to the knife and saw frame 27. As each slice is cut from the meat the operator moves the same longitudinally thereby moving the carriage 4 and consequently moving the spring actuated dog 8 into the adjacent notch and bar 3, or of one of the notched bars 69 which may have been raised. If the operator desires to lock the device in raised position he may do so by raising the reach bar and in fact tilting the device on the pintles 10, then moving the device including the tiltable parts longitudinally on the rectangular shaped member 11 until the lug 82 carried by the sleeve 12 engages in one of the concentrically disposed apertures 83 in one of the spaced arms 9. If the operator so desires he may lay the saw and knife frame and the reach frame on their side on the block for cleaning purposes. To accomplish this result the operator grasps the handle 47, imparts a rearward twist on the same until the lug is out of engagement with the recess 18, at which time the device may be tilted sidewise and laid on the block. Cylindrical casing 13 is provided with a lug 84 by means of which lug downward movement of the toothed lever 68 may be limited.

From the above it will be seen that a meat cutting and sawing machine is provided which is compact in form, and one wherein the operation is positive, and the parts reduced to a minimum. It will also be seen that a meat cutting machine is provided wherein it will be possible to cut meat in slices of various thickness.

The invention having been set forth what is claimed as new and useful is:—

1. A meat severing machine comprising a base, a frame horizontally movable on said base, said frame having one of its ends pivotally mounted, a reciprocating element carried by said frame, means carried by the frame for reciprocating said reciprocating element and means for controlling the reciprocation of the reciprocating element by a movement of the frame.

2. A meat severing machine comprising a base, a pivoted frame disposed on said base and tiltable vertically, a horizontally movable carriage, said frame being pivoted to said horizontally movable carriage, a gage, means carried by said carriage and coöperating with said gage whereby successive slices of meat may be severed of equal thickness, means whereby slices of various thicknesses may be severed, a severing element carried by the frame and means for operating said severing element.

3. A meat severing machine comprising a base, a pivoted frame disposed on said base, a horizontally movable carriage, said frame being pivoted to said horizontally movable carriage, a notched gage bar, said carriage being longitudinally movable on said notched gage bar, means carried by the carriage and coöperating with the notches of said gage bar for holding said carriage in various positions, a meat severing element carried by said frame and means whereby said meat severing element may be operated during a severing operation.

4. A meat severing machine comprising a base, a frame disposed on said base, said frame having one of its ends pivotally mounted, means whereby said frame may be moved in a horizontal plane, a reciprocating severing element carried by said frame, means whereby said severing element may be reciprocated and a lever pivoted to the frame and adapted to engage the meat for holding the same during a meat severing operation.

5. The combination with a meat severing machine comprising a meat severing element carried by a movable carriage, of notched bars disposed adjacent said carriage, means carried by the carriage and coöperating with said notched bars, and means whereby any of said bars may be positioned for coöperating with the carriage.

6. A meat severing machine comprising a movable carriage, a meat severing element carried by said movable carriage, a notched bar, said carriage being movable on said notched bar, a pawl carried by said carriage and coöperating with notches of said bar, a plurality of notched bars disposed adjacent the first mentioned notched bars, and means whereby any of the plurality of notched bars may be moved into an operative position with the pawl carried by the carriage.

7. The combination with a meat severing machine comprising a movable carriage, a meat severing element carried by said movable carriage, a notched bar, said carriage being movable on said notched bar, of means whereby successive movements of the carriage may be accurately gaged for various distances, said means comprising a dog carried by the carriage and coöperating with notches on said notched bar.

8. The combination with a meat severing machine comprising a movable carriage, a meat severing element, said meat severing element being carried by said movable carriage, a notched bar, said carriage being movable on said notched bar, of means whereby successive movements of the carriage may be accurately gaged for various distances, said means comprising a plurality of movable notched bars disposed adjacent the first mentioned notched bar, a dog carried by the carriage and disposed in a position to coöperate with the notches of the notched bars and key means whereby any of the notched bars may be positioned for coöperating with the dog carried by the carriage.

9. A meat severing machine comprising a base, a horizontally movable and vertically pivoted frame carried by said base, a combined knife and saw frame carried by said first mentioned frame, a rotatable member carried by the pivoted frame and provided with an endless groove, a member slidably mounted on the rotatable member and having a roller disposed in the endless groove, said slidable member being connected to the saw frame, and means for rotating the rotatable member as desired by the operator.

10. The combination with a meat severing machine having a reciprocating severing element frame, of means for reciprocating said severing element frame, said means comprising a rotatable cylindrical member having an endless crossed guide groove, a member longitudinally movable on said rotatable member and connected to the severing element frame, a roller carried by the longitudinally movable member and disposed in the endless crossed groove of the rotatable member and means for rotating the rotatable member.

11. The combination with a meat severing machine having a reciprocating severing element frame, of means for reciprocating said severing element frame, said means comprising a rotatable cylindrical member having an endless crossed guide groove spirally around the cylindrical member, a longitudinally movable sleeve disposed on said cylindrical member, a member carried by said sleeve and disposed in the groove of the cylindrical member and connecting means between the longitudinal movable sleeve and the severing element frame.

12. The combination with a meat severing machine having a reciprocating severing element frame, of means for reciprocating said severing element frame, said means comprising a rotatable cylindrical member having an endless crossed guide groove spirally around the same, a longitudinally movable sleeve carried by the severing element frame, a member carried by said sleeve and disposed in the groove of the cylindrical member, connecting means between the rotatable cylindrical member and its source of power and means whereby the rotatable cylindrical member may be rotated as desired.

13. The combination with a meat severing machine having a reciprocating severing element frame, of means for reciprocating said severing element frame, said means comprising a rotatable cylindrical member having an endless crossed guide groove spirally around the same, a longitudinally movable sleeve carried by the severing element frame, means for guiding said sleeve in its longitudinal movement and preventing rotation of the same, a member carried by the longitudinally movable sleeve and disposed in the groove of the rotatable element and spring actuated members disposed in the rotatable member at the point of intersection of the groove and forming means for guiding the member carried by the longitudinally movable sleeve diagonally across the point of intersection of the groove during the rotation of the rotatable member.

In testimony whereof I affix my signature.

JOHN B. RAICH.